US012523069B2

United States Patent

(12) United States Patent
Shinohara

(10) Patent No.: US 12,523,069 B2
(45) Date of Patent: Jan. 13, 2026

(54) DOOR LATCH DEVICE

(71) Applicant: MITSUI KINZOKU ACT CORPORATION, Kanagawa (JP)

(72) Inventor: Takuya Shinohara, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

(21) Appl. No.: 18/896,161

(22) Filed: Sep. 25, 2024

(65) Prior Publication Data

US 2025/0012118 A1 Jan. 9, 2025

Related U.S. Application Data

(63) Continuation of application No. 17/707,426, filed on Mar. 29, 2022, now Pat. No. 12,123,226, which is a (Continued)

(30) Foreign Application Priority Data

Oct. 8, 2019 (JP) ................................ 2019-185484

(51) Int. Cl.
*E05B 77/06* (2014.01)
*E05B 85/26* (2014.01)

(52) U.S. Cl.
CPC .............. *E05B 77/06* (2013.01); *E05B 85/26* (2013.01)

(58) Field of Classification Search
CPC .......... E05B 77/02; E05B 77/04; E05B 77/06; E05B 77/12; E05B 85/24; E05B 85/243; E05B 85/26
See application file for complete search history.

(56) References Cited

U.S. PATENT DOCUMENTS 8,764,077 B2 * 7/2014 Takagi .................. E05B 85/243 292/336.3
9,109,381 B2 * 8/2015 Lee ......................... E05B 77/06
(Continued)

FOREIGN PATENT DOCUMENTS

DE 10-2015-109946 A1 12/2016
JP 2011-026780 A 2/2011
(Continued)

OTHER PUBLICATIONS

Notice of Allowance issued in corresponding U.S. Appl. No. 17/707,426, dated Jun. 27, 2024.
(Continued)

*Primary Examiner* — Kristina R Fulton
*Assistant Examiner* — Noah Horowitz
(74) *Attorney, Agent, or Firm* — Rimon P.C.

(57) ABSTRACT

A door latch device includes: an open link including a lever main body, an inertia lever part, and a release energizing member configured to energize the inertia lever part to be maintained at an operating position with respect to the lever main body, an operation force of the door handle being not transmitted to the ratchet lever even in a state in which the lever main body is disposed at an unlocked position, in a case where the inertia lever part is disposed at a non-operating position against energizing force of the release energizing member; a ratchet lever; and a restriction mechanism disposed between the lever main body and the inertia lever part, the restriction mechanism being configured to restrict returning movement to the operating position in a case where the inertia lever part moves to the non-operating position.

4 Claims, 12 Drawing Sheets

Related U.S. Application Data continuation of application No. PCT/JP2020/003808, filed on Jan. 31, 2020.

(56) References Cited

U.S. PATENT DOCUMENTS

| | | | | |
|---|---|---|---|---|
| 9,243,429 | B2 * | 1/2016 | Bendel | E05B 85/26 |
| 9,366,063 | B2 * | 6/2016 | Rosales | E05B 85/26 |
| 9,874,046 | B2 * | 1/2018 | Wittelsbuerger | E05B 77/06 |
| 10,508,475 | B2 * | 12/2019 | Rosales | E05B 77/06 |
| 10,655,366 | B2 * | 5/2020 | Cumbo | E05B 85/20 |
| 10,907,384 | B2 * | 2/2021 | Damboiu | E05B 81/42 |
| 10,934,746 | B2 | 3/2021 | Debroucke et al. | |
| 10,961,749 | B2 * | 3/2021 | Akagi | E05B 77/06 |
| 11,180,933 | B2 * | 11/2021 | Taga | E05B 85/02 |
| 11,608,660 | B2 * | 3/2023 | Graute | E05B 77/06 |
| 11,920,384 | B2 * | 3/2024 | Fuchs | E05B 77/06 |
| 2012/0110920 | A1 | 5/2012 | Takagi et al. | |
| 2016/0090758 | A1 | 3/2016 | Bendel | |
| 2016/0090759 | A1 | 3/2016 | Rosales et al. | |
| 2016/0108653 | A1 * | 4/2016 | Guelkan | E05B 77/04 292/341.17 |
| 2017/0370128 | A1 | 12/2017 | Akagi et al. | |
| 2020/0056404 | A1 | 2/2020 | Fuchs et al. | |
| 2021/0032910 | A1 | 2/2021 | Fuchs et al. | |

FOREIGN PATENT DOCUMENTS

| | | | |
|---|---|---|---|
| JP | 2013-113043 | A | 6/2013 |
| JP | 5285524 | B2 | 9/2013 |
| JP | 2018-003305 | A | 1/2018 |

OTHER PUBLICATIONS

Office Action issued in corresponding U.S. Appl. No. 17/707,426, dated Mar. 4, 2024.

International Search Report issued in corresponding International Patent Application No. PCT/JP2020/003808, dated Mar. 31, 2020, with English translation.

* cited by examiner (UNLOCKED STATE)

(LOCKED STATE)

(OPERATING POSITION)

(NON-OPERATING POSITION)

(OPERATING POSITION)

(NON-OPERATING POSITION)

DOOR LATCH DEVICE

CROSS REFERENCE TO RELATED APPLICATIONS

This application is a continuation of application Ser. No. 17/707,426, filed Mar. 29, 2022, which is a continuation of International Application No. PCT/JP2020/003808, filed on Jan. 31, 2020, which claims the benefit of priority of the prior Japanese Patent Application No. 2019-185484, filed on Oct. 8, 2019, the entire contents of which are incorporated herein by reference.

BACKGROUND

The present disclosure relates to a door latch device.

As a door latch device for keeping a door in a closed state with respect to a vehicle main body, there has been developed a door latch device configured to prevent the door from being accidentally opened even in a case where impact force is applied to the vehicle main body. For example, Japanese Patent Application Laid-open No. 2011-26780 discloses a door latch device including a lever main body and an inertia lever part as an open link that operates when an opening operation is performed on a door handle to perform a release operation on a ratchet lever. The lever main body moves in accordance with the opening operation for the door handle, and can be displaced between an unlocked position and a locked position. The inertia lever part is supported by the lever main body to be displaceable between an operating position and a non-operating position, and is energized to be maintained at the operating position by a release energizing spring.

In this door latch device, when impact force is applied to the vehicle due to a side collision and the like, the inertia lever part moves to the non-operating position against energizing force of the release energizing spring. The inertia lever part moved to the non-operating position is not engaged with the ratchet lever even in a case where the lever main body moves. Accordingly, in a state in which the inertia lever part is placed at the non-operating position, even if the door handle moves with respect to the vehicle main body due to influence of the impact force, it is possible to prevent a situation in which the door is accidentally opened.

SUMMARY

It has been found that, in a case where impact force is applied to the vehicle main body due to a collision and the like, the door handle operates in an opening operation direction multiple times in a very short time with respect to the vehicle main body. The inertia lever part of the door latch device described above returns to the operating position due to the energizing force of the release energizing spring even after moving to the non-operating position. Thus, in a case where the door handle operates in the opening operation direction in a state in which the inertia lever part returns to the operating position, a situation in which the door is accidentally opened may be caused.

There is a need for a door latch device that is able to more securely prevent a situation in which a door is accidentally opened when impact force is applied to a vehicle main body.

According to one aspect of the present disclosure, there is provided a door latch device including: an open link configured to be changed between an unlocked state and a locked state, operate in a case where an opening operation is performed on a door handle, and transmit an operation force to a ratchet lever in the case where the opening operation is performed on the door handle in the unlocked state, the open link including: a lever main body configured to be displaced to an unlocked position corresponding to the unlocked state and a locked position corresponding to the locked state, and move in accordance with the opening operation performed on the door handle; an inertia lever part supported by the lever main body so as to be displaceable between an operating position and a non-operating position; and a release energizing member configured to energize the inertia lever part to be maintained at the operating position with respect to the lever main body, the operation force of the door handle being not transmitted to the ratchet lever even in a state in which the lever main body is disposed at the unlocked position, in a case where the inertia lever part is disposed at the non-operating position against energizing force of the release energizing member; the ratchet lever configured to release an engaging state of a ratchet with a latch in a case where the operation force is applied via the open link; and a restriction mechanism disposed between the lever main body and the inertia lever part, the restriction mechanism being configured to restrict returning movement to the operating position in a case where the inertia lever part moves to the non-operating position.

BRIEF DESCRIPTION OF THE DRAWINGS

FIG. 6A is a diagram viewed from the inner side of the vehicle, and FIG. 6B is a perspective view viewed from obliquely downward;

FIG. 7A is a diagram viewed from the inner side of the vehicle, and FIG. 7B is a perspective view viewed from obliquely downward;

FIG. 10A is a perspective view viewed from the inner side and the upper side of the vehicle, and FIG. 10B is a diagram viewed from the inner side of the vehicle;

FIG. 11A is a perspective view viewed from the inner side and the upper side of the vehicle, and FIG. 11B is a diagram viewed from the inner side of the vehicle.

DETAILED DESCRIPTION

The following describes an embodiment of a door latch device according to the present disclosure in detail with reference to the attached drawings. In the following description, respective directions are specified in a state in which the door latch device is mounted on a vehicle.

Figure 1:
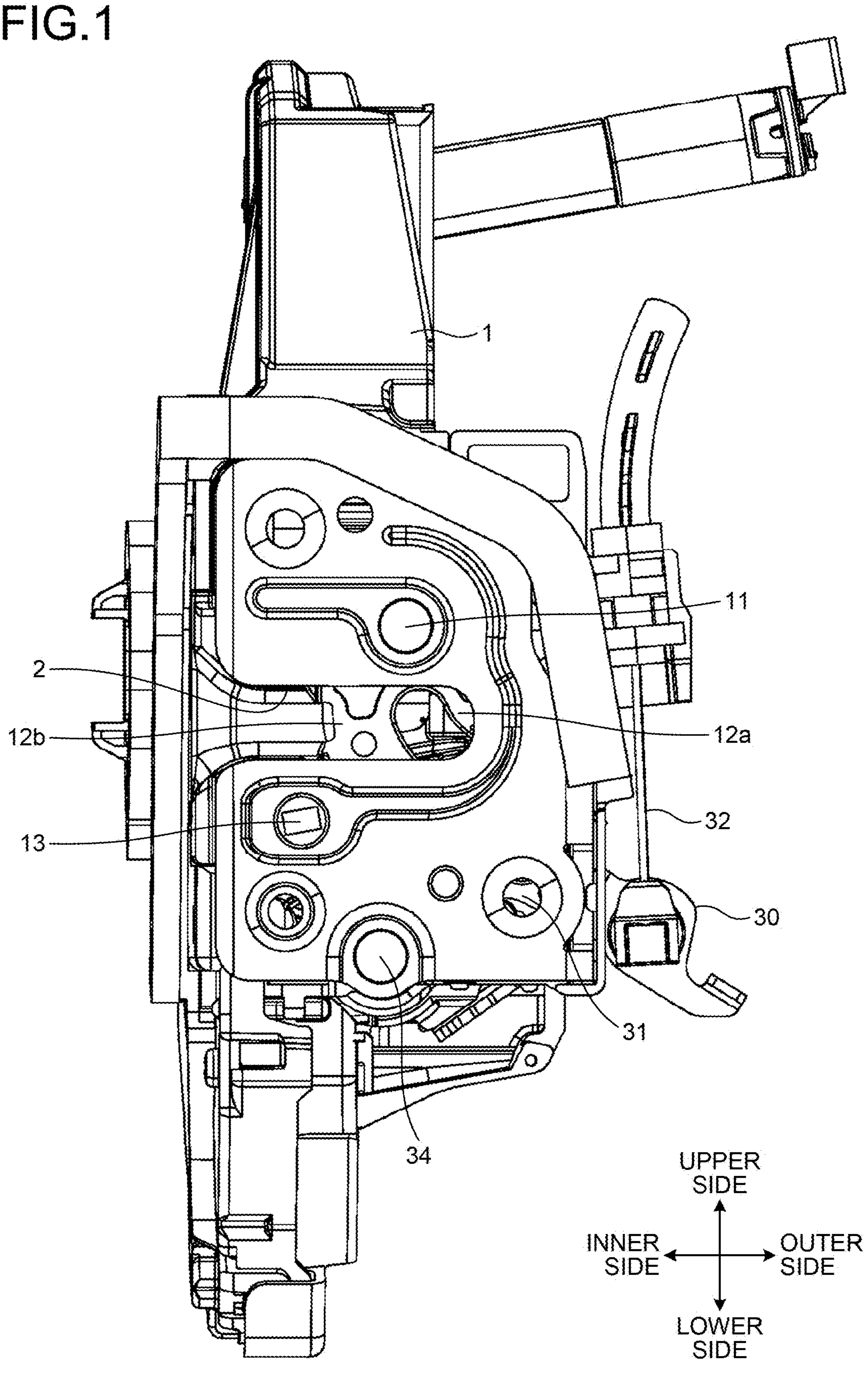
FIG. 1 is a diagram illustrating external appearance of a door latch device according to an embodiment viewed from a rear side of a vehicle.
Figure 2:
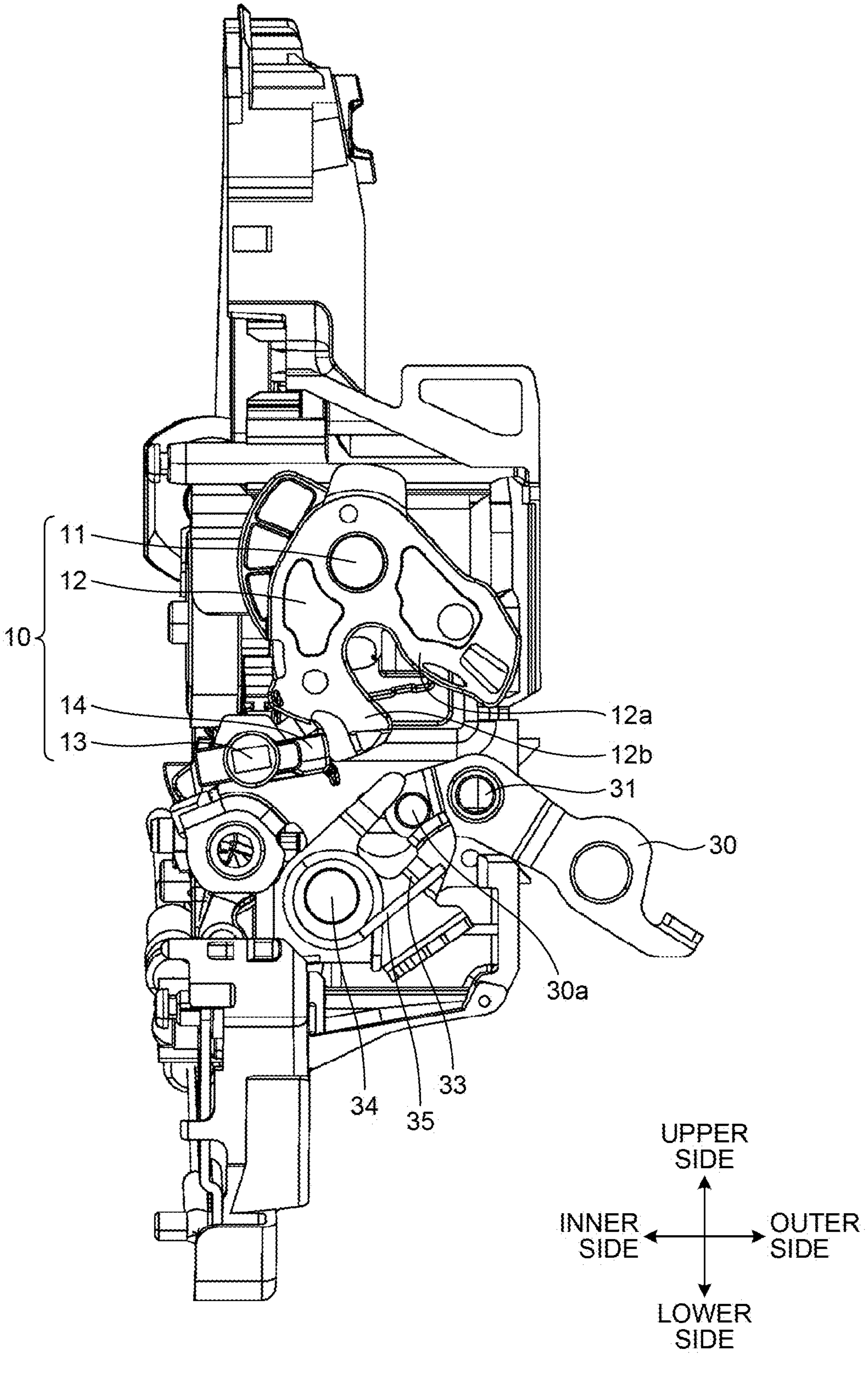
FIG. 2 is a diagram illustrating a state of eliminating a housing from FIG. 1.
Figure 3:
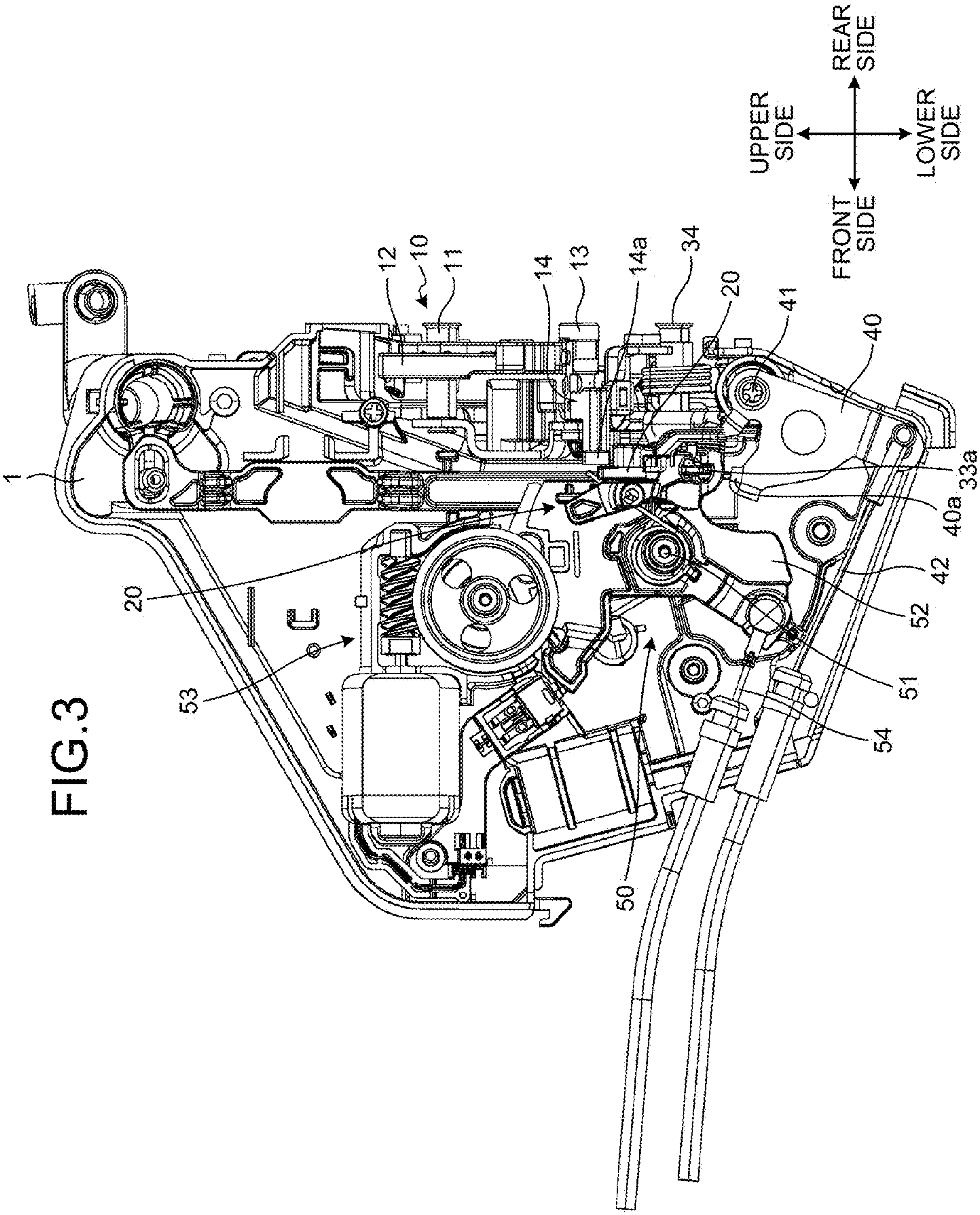
FIG. 3 is a diagram illustrating an internal structure of the door latch device illustrated in FIG. 1 viewed from an inner side of the vehicle.

FIG. 1 to FIG. 3 illustrate the door latch device according to the embodiment. Although not illustrated in the drawings, the door latch device exemplified herein is mounted on a side door having a front hinge that is disposed on the right side of a four-wheeled automobile, and performs opening/closing control for the side door by changing an engaging state with a striker disposed on a vehicle main body in accordance with an opening operation with a door handle or a locking/unlocking operation with a key. In the door latch device, a latch unit 10 is disposed inside a housing 1.

The latch unit 10 includes a latch 12 disposed to be rotatable via a latch shaft 11, and a ratchet 14 disposed to be rotatable via a ratchet shaft 13. The latch shaft 11 and the ratchet shaft 13 both extend substantially horizontally along a front and rear direction of the vehicle. In the example illustrated in the drawing, the latch shaft 11 is disposed at a portion on an upper side of the vehicle than a striker entry groove 2 that is disposed on the housing 1, and the ratchet shaft 13 is disposed at a portion on a lower side of the vehicle than the striker entry groove 2 and on an inner side of the vehicle than the latch shaft 11. When a closing operation is performed on the side door, a striker (not illustrated) enters the striker entry groove 2 from the left side of FIG. 1 that is relatively the inner side of the vehicle.

The latch 12 includes a striker abutting part 12*a* and a hook part 12*b*, and is energized in a release direction (clockwise in FIG. 1) by spring force of a latch spring (not illustrated) to be disposed in an engagement standby state. The engagement standby state is a state in which the hook part 12*b* is retracted toward an upper side with respect to the striker entry groove 2, while the striker abutting part 12*a* is disposed on an inner side (the right side in FIG. 1) of the striker entry groove 2. When the side door is closed and the striker enters the striker entry groove 2, the striker abuts on the striker abutting part 12*a*, the latch 12 rotates counterclockwise against spring force of the latch spring, and the hook part 12*b* is disposed in a state of traversing the striker entry groove 2 on an opening end part side thereof.

The ratchet 14 prevents the latch 12 from rotating in the release direction by engaging with the hook part 12*b* when the hook part 12*b* of the latch 12 is disposed in a state of traversing the striker entry groove 2. The ratchet 14 is energized in a direction of engaging with the latch 12 (counterclockwise in FIG. 1) by spring force of a ratchet spring (not illustrated). Accordingly, when the striker enters the striker entry groove 2, and the hook part 12*b* of the latch 12 is disposed to traverse the striker entry groove 2, the ratchet 14 engages with the hook part 12*b* by spring force of the ratchet spring, and this state is maintained.

A ratchet lever 14*a* is disposed integrally with the ratchet 14. The ratchet lever 14*a* extends toward the inner side of the vehicle from a portion of the ratchet shaft 13 that is positioned to be closer to a front side of the vehicle than the ratchet 14. When the ratchet lever 14*a* is pressed toward the upper side against the spring force of the ratchet spring, the ratchet 14 rotates clockwise in FIG. 1, so that the engaging state with the latch 12 can be released.

An open link 20 is disposed on a portion on a lower side of the ratchet lever 14*a* inside the housing 1. The open link 20 is disposed in the housing 1 to be movable along an upper and lower direction by operation of an outside handle lever 30 and an inside handle lever 40, and to be changeable to an unlocked state and a locked state by rotating about an axis in a direction along the left and right direction of the vehicle by operation of a lock unit 50.

The outside handle lever 30 is disposed at a portion on a lower side than the ratchet shaft 13 to be rotatable by an outside lever shaft 31 along the front and rear direction of the vehicle. An end part of the outside handle lever 30 positioned on an outer side of the vehicle is linked with an outside door handle of the side door (not illustrated) via an outside cable 32. An open lever 33 is linked with an end part 30*a* of the outside handle lever 30 positioned on an inner side of the vehicle. The open lever 33 is disposed at a portion on the inner side of the vehicle than the outside handle lever 30 and on the lower side than the outside lever shaft 31 to be rotatable by an open lever shaft 34 along the front and rear direction of the vehicle, and an end part 33*a* positioned on the inner side of the vehicle engages with a rotation center part of the open link 20. When an opening operation is performed on the outside door handle, the outside handle lever 30 rotates counterclockwise in FIG. 2 via the outside cable 32, the open lever 33 rotates clockwise in FIG. 2, and the open link 20 moves toward the upper side via the end part 33*a*. When the opening operation for the outside door handle is stopped, the open lever 33 rotates counterclockwise by spring force of a return spring 35, and the open link 20 and the outside handle lever 30 return to an original state.

The inside handle lever 40 is disposed at a portion on the lower side than the open link 20 to be rotatable by an inside lever shaft 41 along the left and right direction of the vehicle, and a front end portion 40*a* positioned on the front side thereof is opposed to a lower end face of the open link 20. A lower end part of the inside handle lever 40 is linked with an inside door handle of the side door via an inside cable 42. When an opening operation is performed on the inside door handle, the inside handle lever 40 rotates clockwise in FIG. 3 via the inside cable 42, and the open link 20 moves toward the upper side via the front end portion 40*a* of the inside handle lever 40. At this point, along with the movement of the open link 20 toward the upper side, the open lever 33 is caused to be in a state of being rotated clockwise in FIG. 2. Accordingly, when the opening operation for the inside door handle is stopped, the open lever 33 rotates counterclockwise by spring force of the return spring 35, and the open link 20 and the inside handle lever 40 return to an original state.

Figure 4:
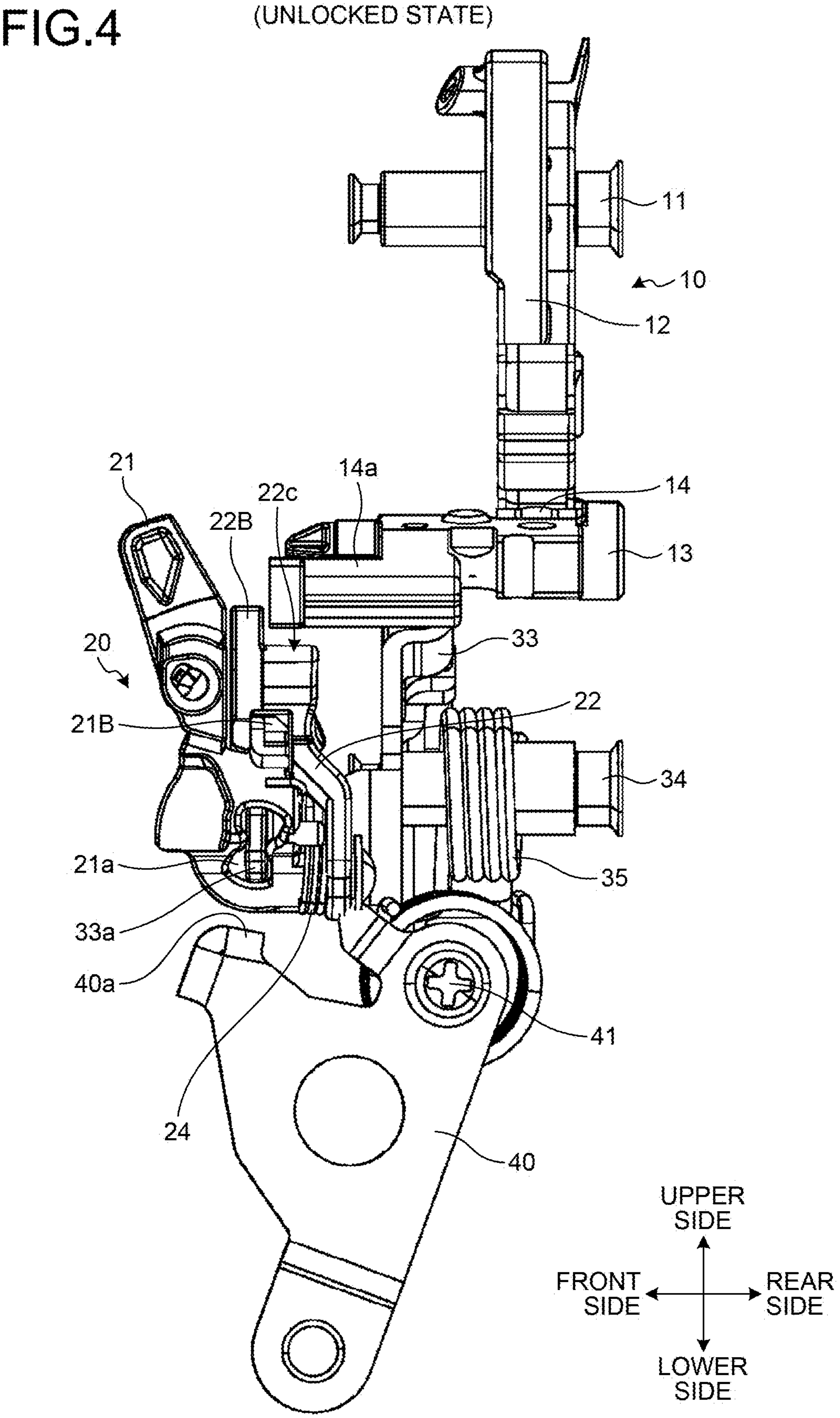
FIG. 4 is a diagram illustrating a principal part of the internal structure viewed from the inner side of the vehicle in a case where the door latch device illustrated in FIG. 1 is in an unlocked state.
Figure 5:
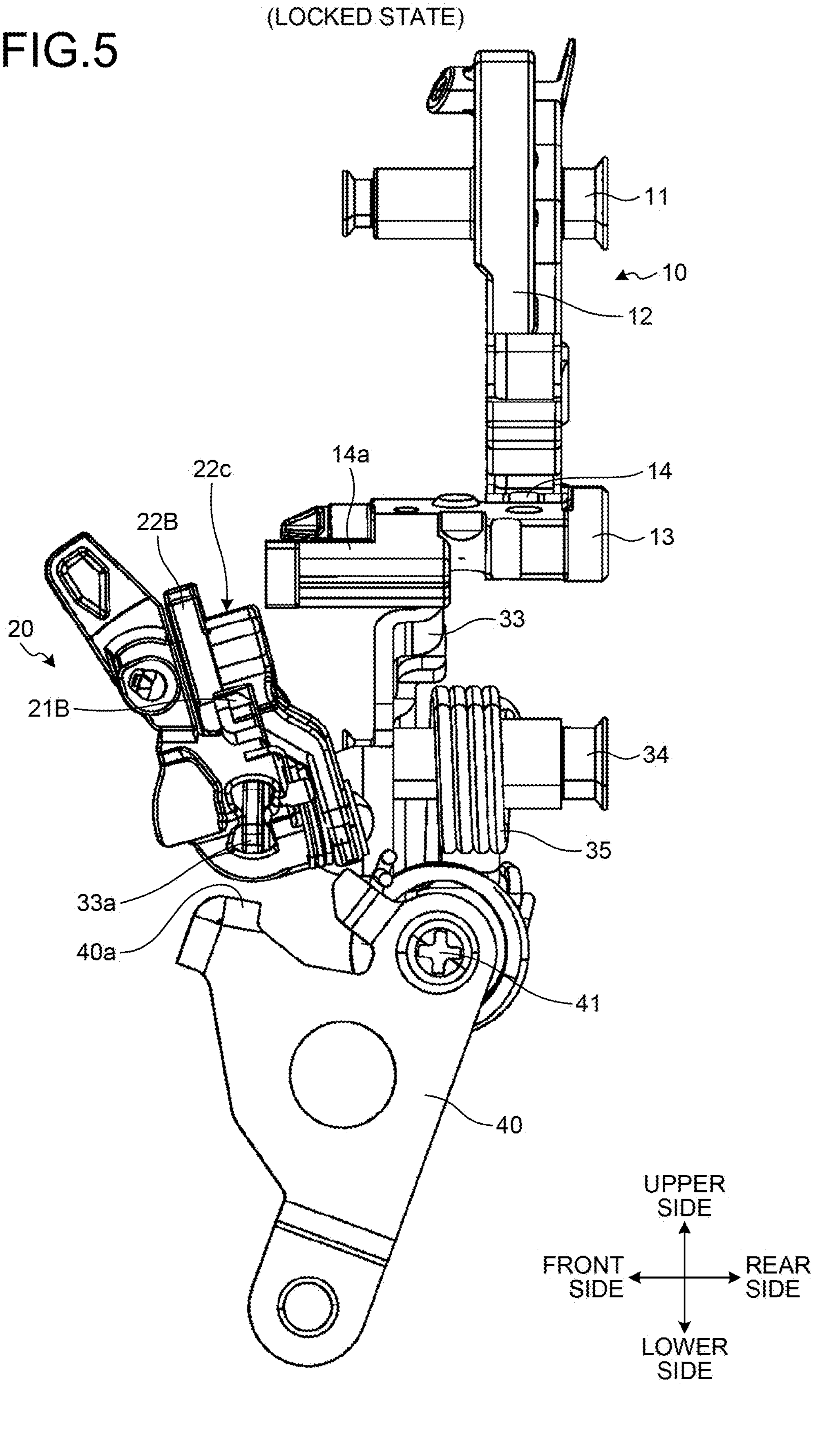
FIG. 5 is a diagram illustrating the principal part of the internal structure viewed from the inner side of the vehicle in a case where the door latch device illustrated in FIG. 1 is in a locked state.

The lock unit 50 engages with the open link 20 via a lock lever 52 that rotates about an axis of a lock shaft 51 along the left and right direction of the vehicle, and includes an actuator unit 53 engaging with the lock lever 52 and a lock cable 54. A lock operation and an unlock operation are performed on the actuator unit 53 by operating a remote control held by a user of the vehicle. The lock operation and the unlock operation are performed on the lock cable 54 by operating a lock knob disposed on the side door. When the unlock operation is performed on the actuator unit 53 or the lock cable 54, the open link 20 rotates clockwise in FIG. 3 via the lock lever 52, and is caused to be in a substantially upright state, that is, an unlocked state as illustrated in FIG. 4. Similarly, when the lock operation is performed on the actuator unit 53 or the lock cable 54, the open link 20 rotates counterclockwise in FIG. 3 via the lock lever 52, and is caused to be in a forward-tilted state, that is, a locked state as illustrated in FIG. 5.

Figure 8:
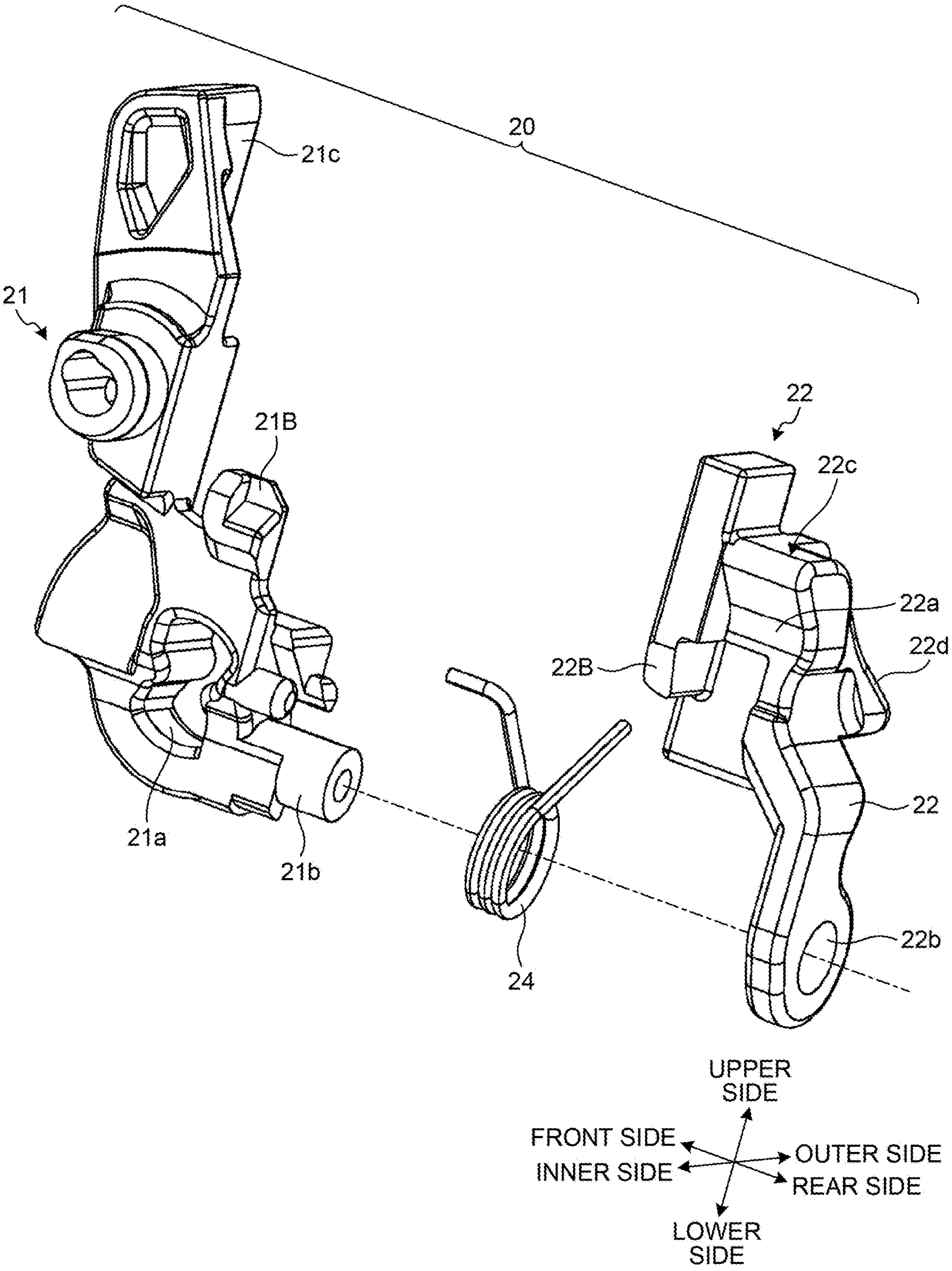
FIG. 8 is an exploded perspective view of the open link of the door latch device illustrated in FIG. 1 viewed from the inner side of the vehicle.
Figure 9:
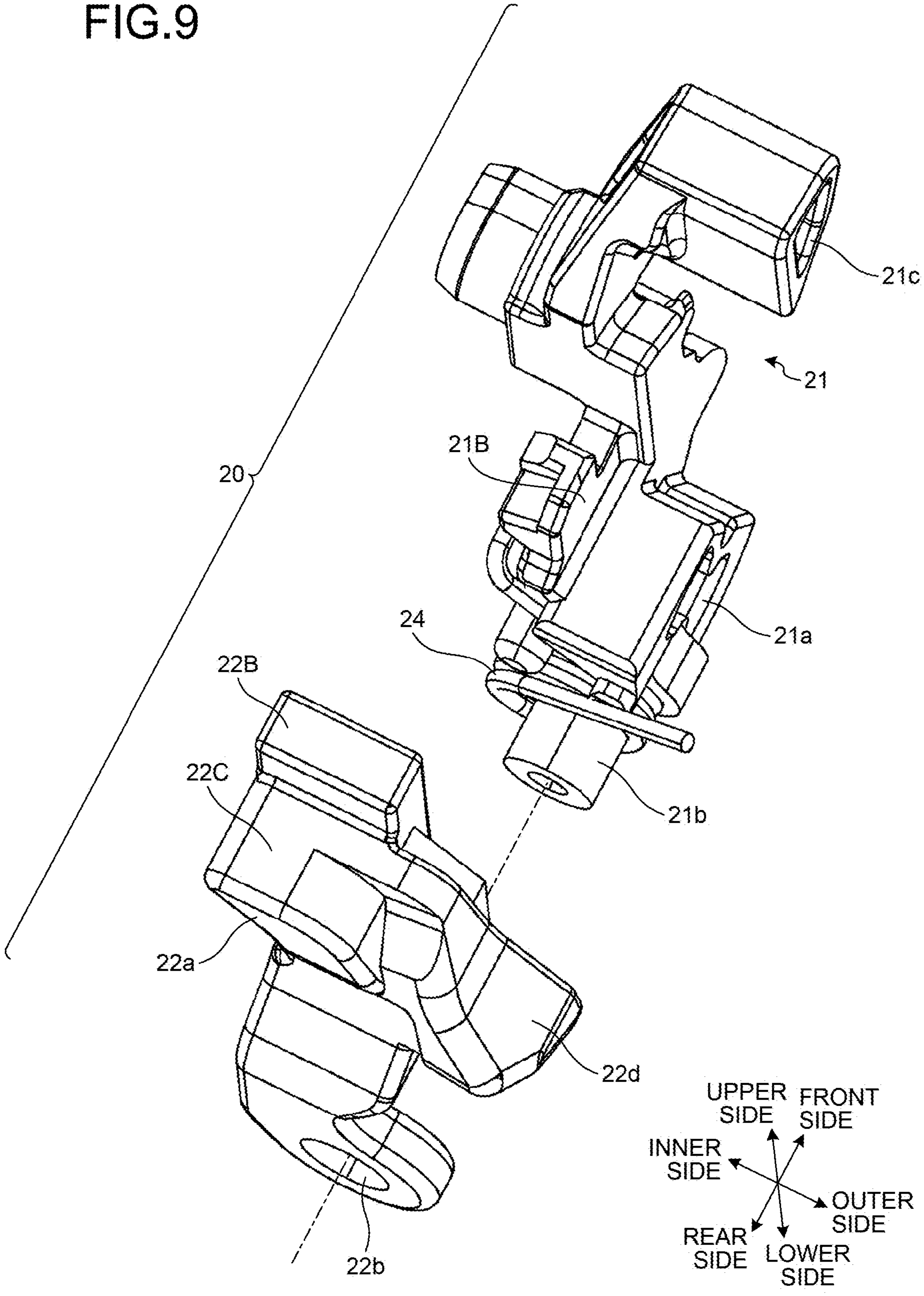
FIG. 9 is an exploded perspective view of the open link of the door latch device illustrated in FIG. 1 viewed from an outer side and an upper side of the vehicle.

In the present embodiment, as illustrated in FIG. 8 and FIG. 9, an open link including a lever main body 21 and an inertia lever part 22 is applied as the open link 20 described above.

The lever main body 21 includes an engagement hole 21*a* and a support shaft part 21*b* at a lower end, and includes a lock engagement part 21*c* at an upper end. The engagement hole 21*a* is an odd-form through hole along the left and right direction of the vehicle, and engages with the end part 33*a* of the open lever 33 positioned on the inner side of the vehicle in a state in which the end part 33*a* can relatively rotate and cannot relatively move in the upper and lower direction. The support shaft part 21*b* has a cylinder shape projecting from a portion adjacent to the engagement hole 21*a* toward the rear side of the vehicle. The lock engagement part 21*c* is a projection part projecting toward the outer side of the vehicle, and engages with the lock lever 52. That is, the lever main body 21 moves toward the upper side in a case where an opening operation is performed on the outside door handle and the inside door handle, is disposed at the forward-tilted locked position when a lock operation is performed on the lock unit 50 and the lock cable 54, and is disposed at the substantially upright unlocked position when an unlock operation is performed thereon. The locked position and the unlocked position of the lever main body 21 correspond to the locked state and the unlocked state of the open link 20, respectively.

The inertia lever part 22 includes an inertial mass body 22*a* at an upper end part, and includes a sliding hole 22*b* at a lower end part. The inertial mass body 22*a* is configured to cause mass of the upper end part to be larger than that of the lower end part of the inertia lever part 22, constitutes a pressing and abutting surface 22*c* at the upper end, and includes a tilted projecting part for returning (returning part) 22*d* at a portion on the rear side of the vehicle. The inertia lever part 22 is supported by the lever main body 21 in a state of being capable of rotating about an axis of the support shaft part 21*b* and capable of sliding along the axis of the support shaft part 21*b* when the support shaft part 21*b* is inserted into the sliding hole 22*b*.

Figure 10A:
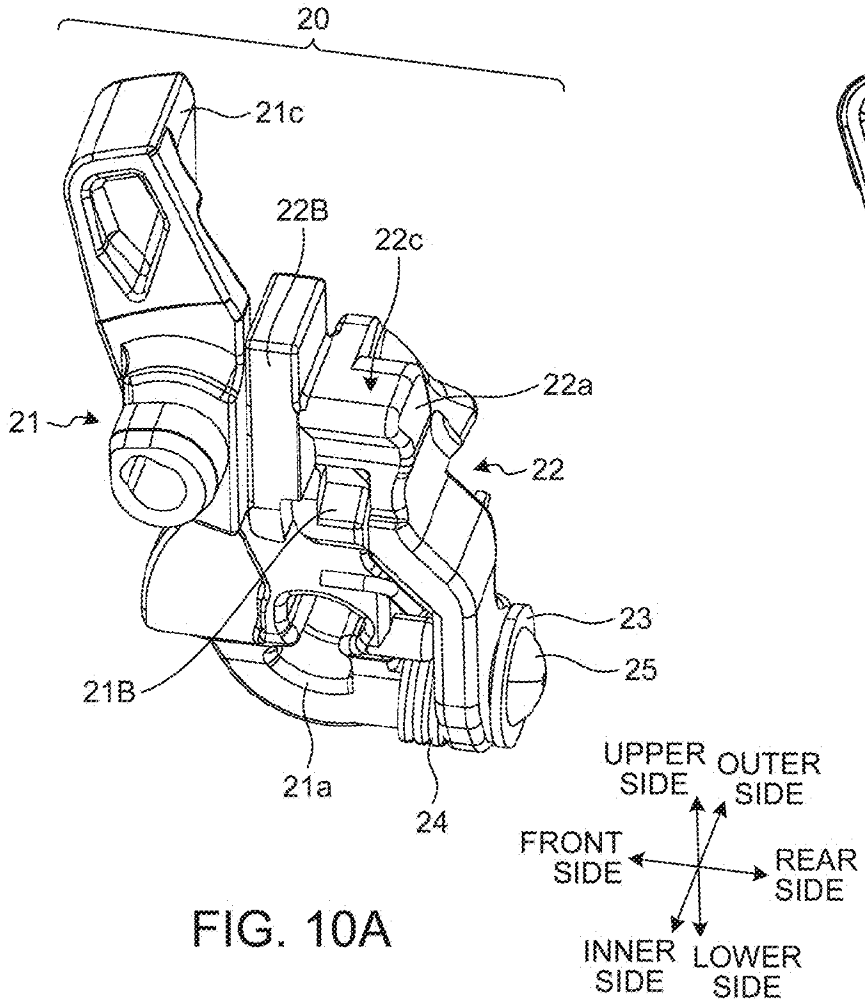
FIGS. 10A and 10B illustrate a case in which the inertia lever part is at the operating position in the open link of the door latch device illustrated in FIG. 1.
Figure 10B:
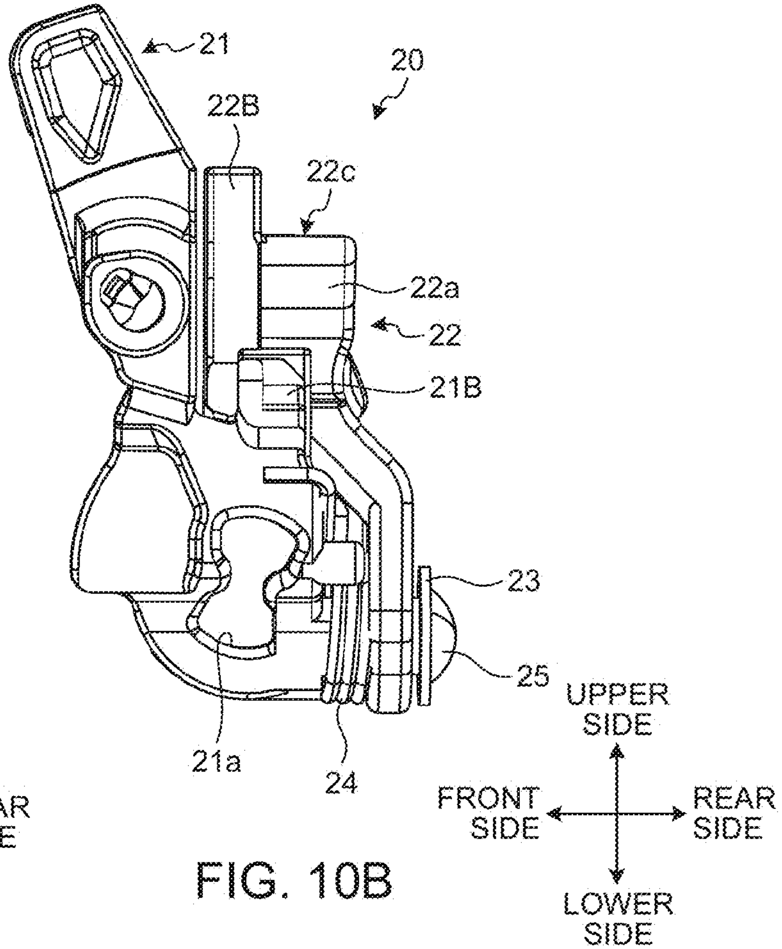
Figure 11B:
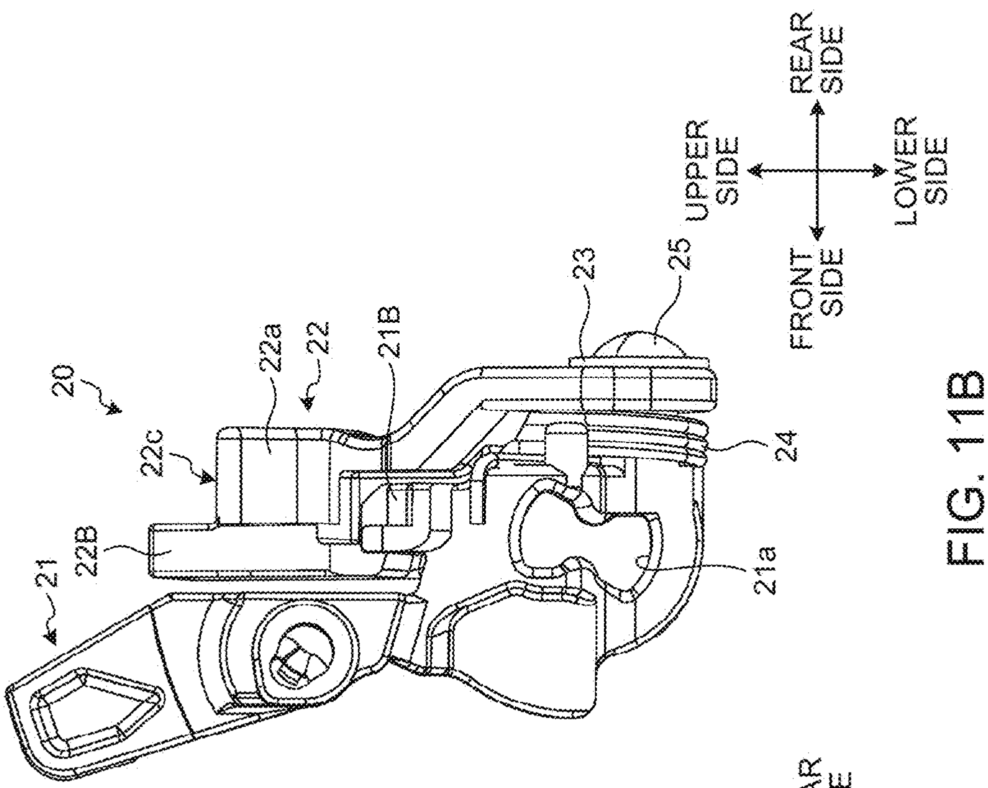
FIGS. 11A and 11B illustrate a case in which the inertia lever part is at the non-operating position in the open link of the door latch device illustrated in FIG. 1.
Figure 11A:
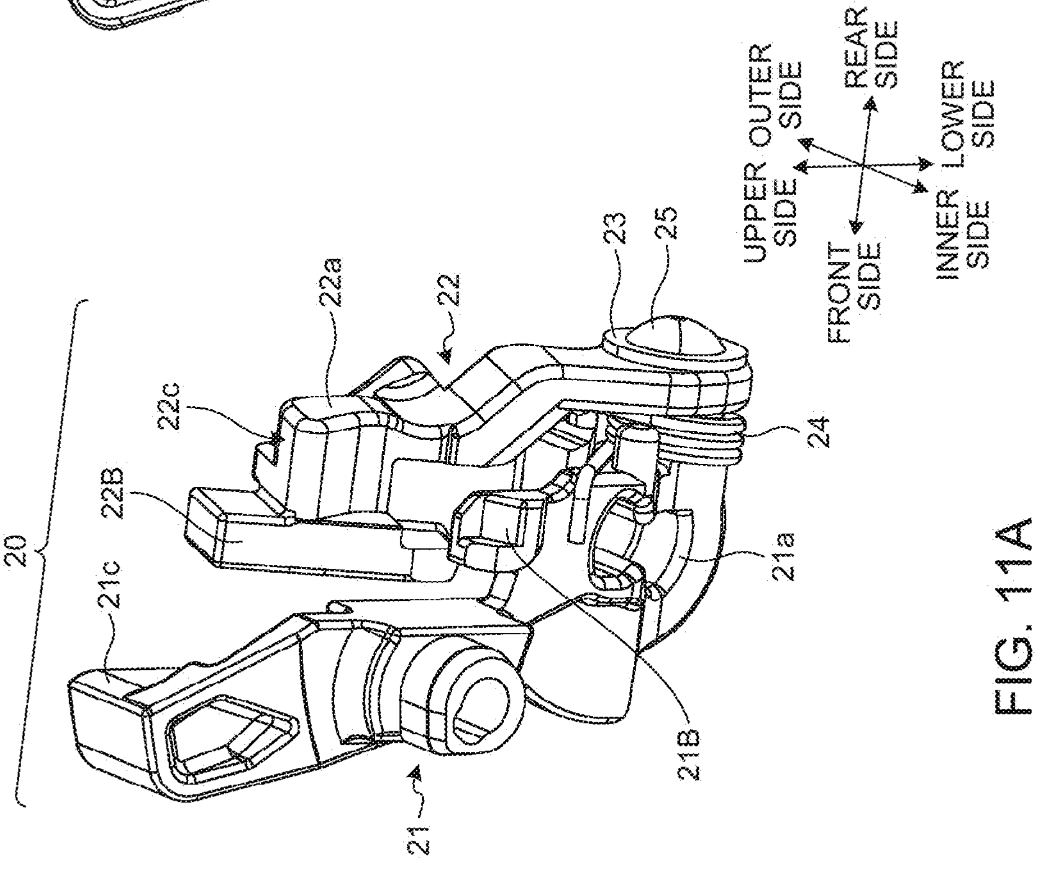

As illustrated in FIG. 10 and FIG. 11, a slide regulating plate 23 is disposed on a projecting end surface of the support shaft part 21*b*, and a torsion coil spring (a release energizing member and a shift energizing member) 24 is disposed at a portion of the support shaft part 21*b* positioned between the lever main body 21 and the inertia lever part 22. The slide regulating plate 23 has a disc shape having an outer diameter larger than an inner diameter of the sliding hole 22*b*, and is fixed to an end face of the support shaft part 21*b* with an attachment screw 25. When viewed from the rear side of the vehicle, the torsion coil spring 24 energizes the inertia lever part 22 to rotate counterclockwise with respect to the lever main body 21, and energizes the lower end part of the inertia lever part 22 to be pressed in an axial direction toward the slide regulating plate 23.

Block parts 21B and 22B are disposed on the lever main body 21 and the inertia lever part 22, respectively. The block parts 21B and 22B are configured to be overlapped with each other in the front and rear direction (axial direction) when the lever main body 21 and the inertia lever part 22 are relatively rotated in a state in which the inertia lever part 22 is disposed on the frontmost side of the support shaft part 21*b* as illustrated in FIG. 10, and configured to be overlapped with each other in a circumferential direction in a state in which the inertia lever part 22 is disposed on the rear side of the support shaft part 21*b* as illustrated in FIG. 11.

Figures 6A, 6B:
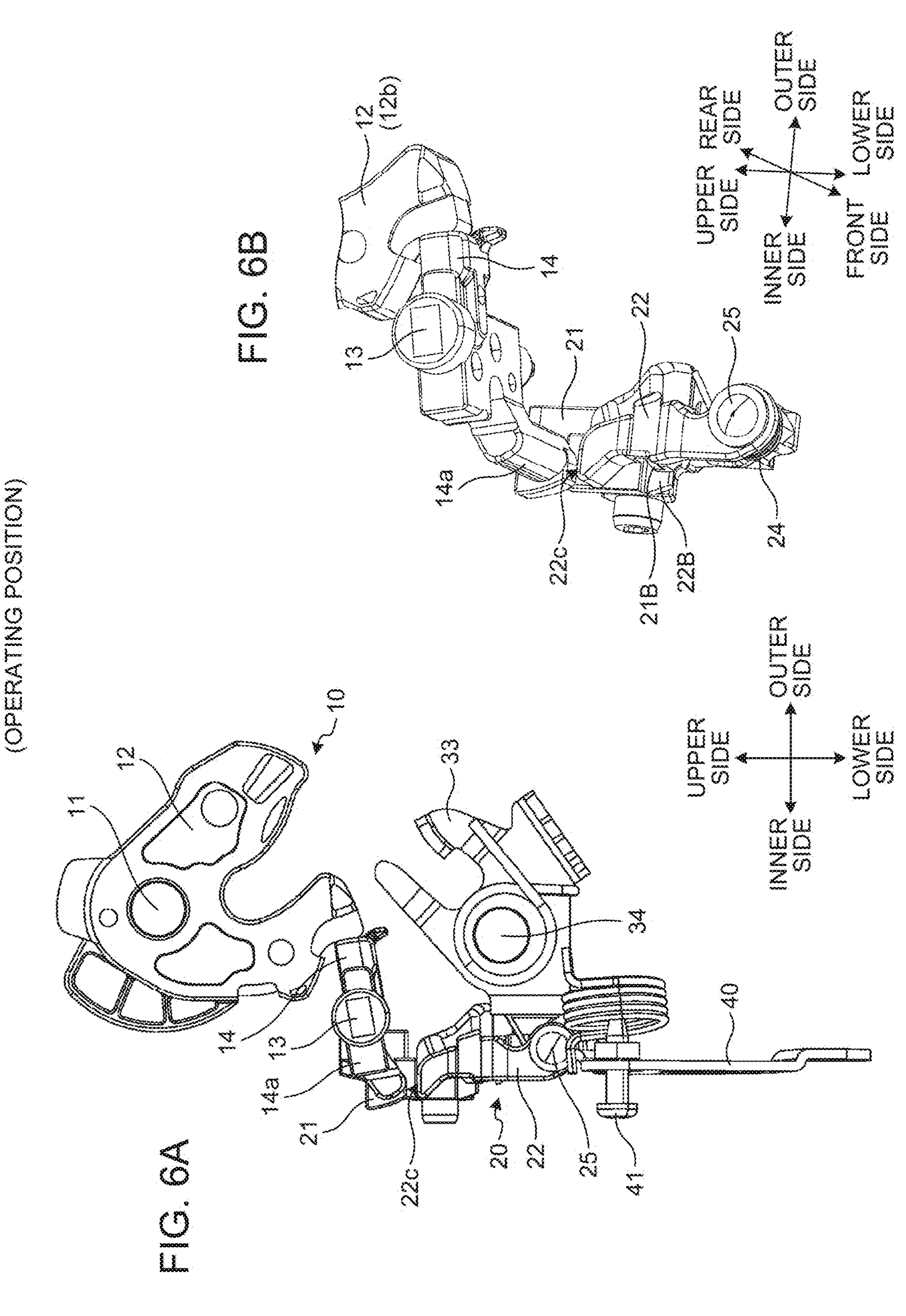
FIGS. 6A and 6B illustrate the principal part of the internal structure in a case where the inertia lever part is at an operating position in an open link of the door latch device illustrated in FIG. 1.

That is, as illustrated in FIG. 10, in a case where the inertia lever part 22 is disposed on the frontmost side of the support shaft part 21*b*, the block parts 21B and 22B are rotated in a direction of approaching each other by energizing force in a rotational direction of the torsion coil spring 24, and are disposed in a state of overlapping with each other in the front and rear direction. In this state, the inertial mass body 22*a* of the inertia lever part 22 is disposed along the lever main body 21. Thus, as illustrated in FIG. 6, in a case where the lever main body 21 is disposed at the unlocked position, the inertia lever part 22 is also disposed substantially along a vertical direction, and the pressing and abutting surface 22*c* at the upper end is caused to be opposed to a lower surface of the ratchet lever 14*a* (operating position of the inertia lever part 22). Accordingly, when the lever main body 21 moves toward the upper side due to an opening operation for the outside door handle and an opening operation for the inside door handle, the ratchet lever 14*a* moves toward the upper side via the pressing and abutting surface 22*c*, and the engaging state of the ratchet 14 with the latch 12 can be released.

Figure 7B:
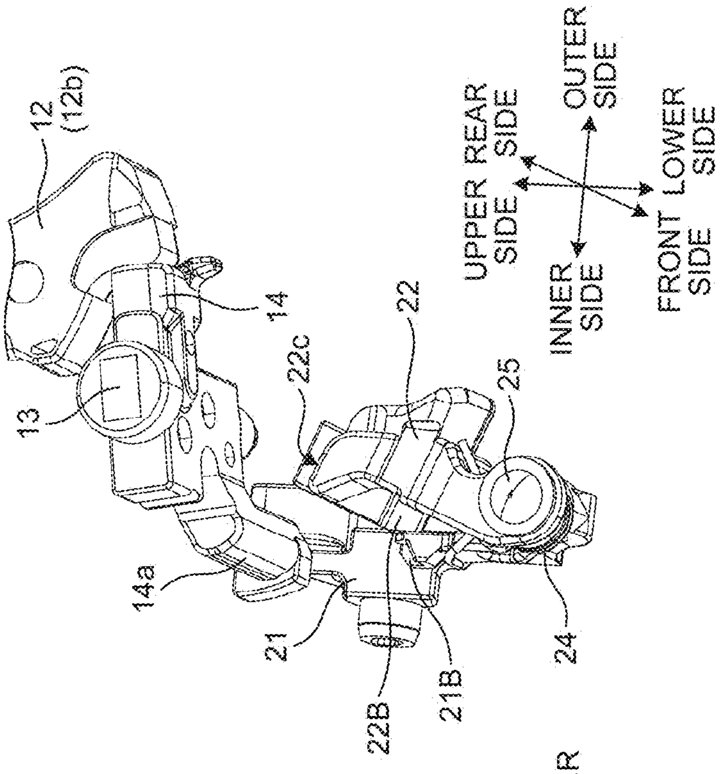
FIGS. 7A and 7B illustrate the principal part of the internal structure in a case where the inertia lever part is at a non-operating position in the open link of the door latch device illustrated in FIG. 1.
Figure 7A:
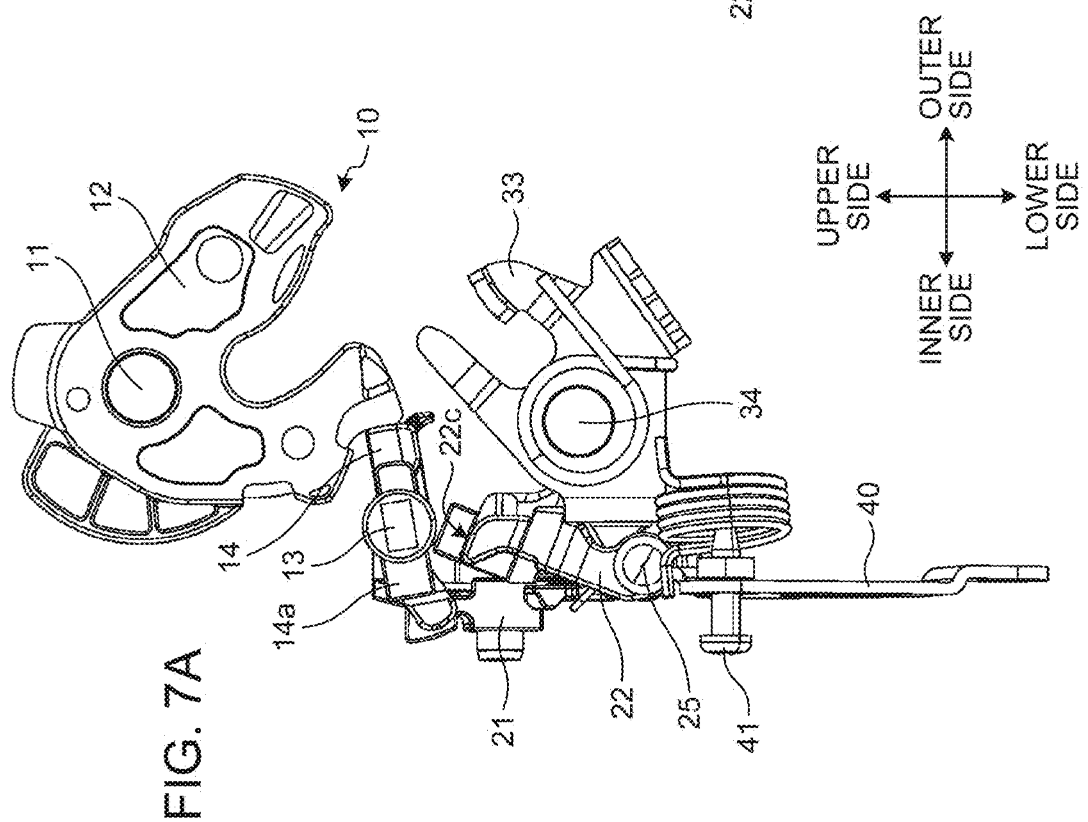

On the other hand, when the inertia lever part 22 is rotated clockwise with respect to the lever main body 21 and overlapping of the block parts 21B and 22B along the front and rear direction is eliminated when viewed from the rear side of the vehicle, as illustrated in FIG. 11, the inertia lever part 22 is slid toward the rear side of the vehicle by energizing force along the axial direction of the torsion coil spring 24, and the lower end part abuts on the slide regulating plate 23 (shift position of the inertia lever part 22). In this state, the block parts 21B and 22B are disposed to be opposed to each other in the circumferential direction, so that the inertia lever part 22 is not rotated counterclockwise by energizing force in the rotational direction of the torsion coil spring 24. Thus, as illustrated in FIG. 7, even in a case where the lever main body 21 is disposed at the unlocked position, the upper end part of the inertia lever part 22 is kept in a state of being tilted toward the outer side of the vehicle, and the pressing and abutting surface 22*c* at the upper end is caused to be in an unopposed state with respect to the lower surface of the ratchet lever 14*a* (non-operating position of the inertia lever part 22). Thus, in this state, the pressing and abutting surface 22*c* does not abut on the ratchet lever 14*a* even if the lever main body 21 moves toward the upper side due to an opening operation for the outside door handle and an opening operation for the inside door handle, and the engaging state of the ratchet 14 with the latch 12 is maintained.

Figure 12:
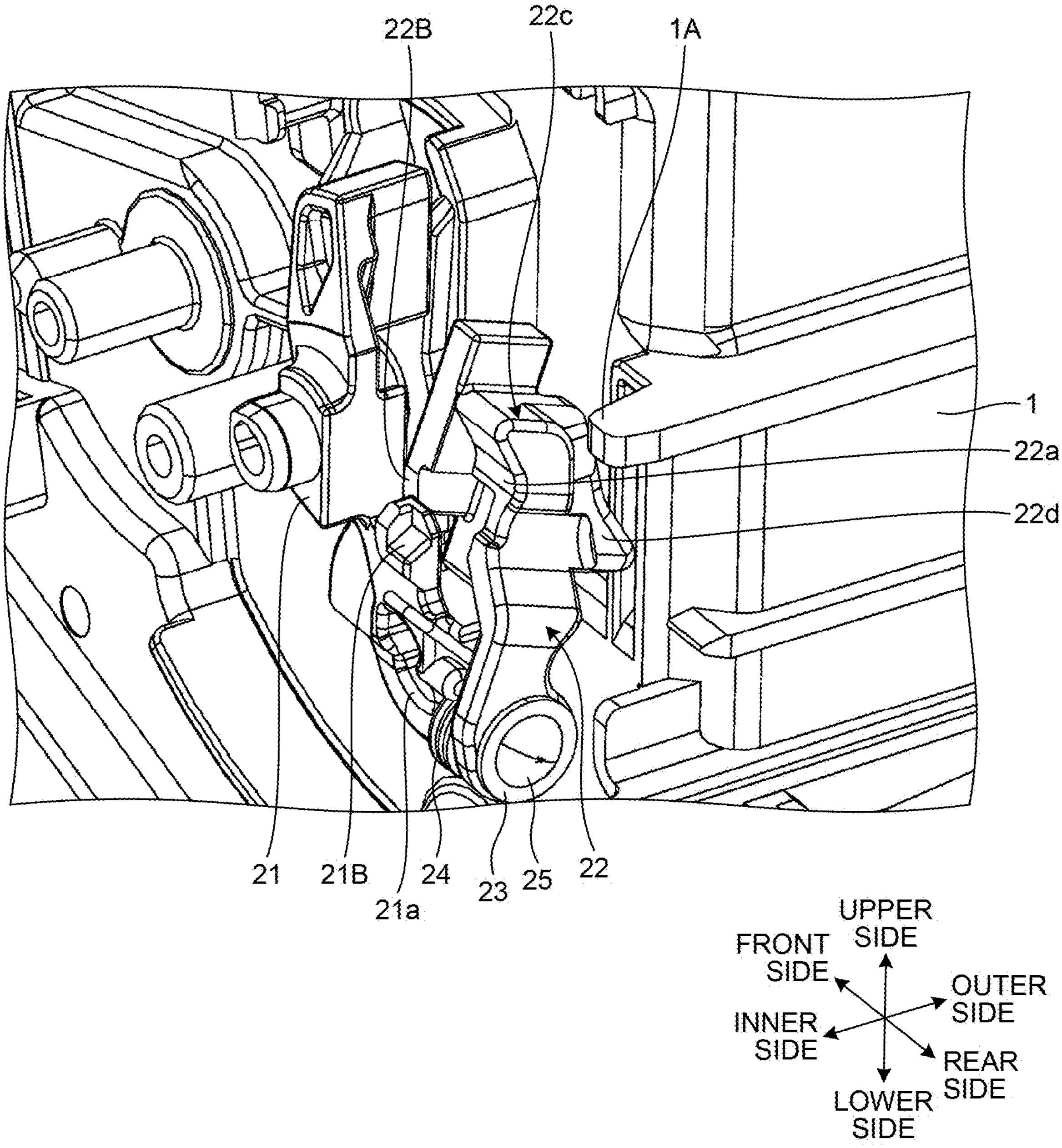
FIG. 12 is a perspective view illustrating relative positions of a projection for returning disposed on the housing and a tilted projecting part for returning of the inertia lever part at the non-operating position in the open link of the door latch device illustrated in FIG. 1.

The tilted projecting part for returning 22*d* abuts on a projection for returning (returning part) 1A of the housing 1 as illustrated in FIG. 12 to cause the inertia lever part 22 to slide toward the front side of the vehicle with respect to the lever main body 21 against energizing force along the axial direction of the torsion coil spring 24 in a case where an opening operation for the outside door handle and an opening operation for the inside door handle are performed with a stroke amount for returning larger than usual in a state in which the inertia lever part 22 is disposed at the non-operating position. When the inertia lever part 22 is slid toward the frontmost side with respect to the lever main body 21, the block part 22B of the inertia lever part 22 is disposed on the front side with respect to the block part 21B of the lever main body 21 to be overlapped therewith in the front and rear direction by energizing force in the rotational direction of the torsion coil spring 24, and the inertia lever part 22 returns to the operating position.

As described above, the door latch device configured as described above is mounted on the vehicle in a state in which the support shaft part 21*b* of the lever main body 21 extends along the front and rear direction of the vehicle, and the inertia lever part 22 is disposed at the operating position. Accordingly, in normal use, the engaging state of the ratchet 14 with the latch 12 is released by an opening operation for the outside door handle and an opening operation for the inside door handle, and the side door can be opened.

When impact force is applied to the vehicle described above due to a side collision, the inertia lever part 22 including the inertial mass body 22*a* at the upper end part rotates against energizing force in the rotational direction of the torsion coil spring 24 due to gravity acceleration in the left and right direction, and the inertia lever part 22 is disposed at the non-operating position. As described above, the inertia lever part 22 disposed at the non-operating position is moved toward the rear side of the vehicle with respect to the lever main body 21 due to the energizing force along the axial direction of the torsion coil spring 24, and the block parts 21B and 22B disposed between the inertia lever part 22 and the lever main body 21 are caused to be in an overlapping state in the circumferential direction. Thus, the inertia lever part 22 does not return to the operating position due to the energizing force in the rotational direction of the torsion coil spring 24. Accordingly, if the door handle moves with respect to the vehicle main body multiple times due to influence of impact force, there is no possibility to cause a situation in which the door is accidentally opened.

In the embodiment described above, exemplified is the door latch device mounted on the side door of the four-wheeled automobile, but the door latch device may be mounted on other types of vehicles. In this case, by disposing the door latch device so that the support shaft part of the lever main body extends along the front and rear direction of the vehicle and the inertial mass body of the inertia lever part is disposed on the upper side, similarly to the embodiment, it is possible to prevent the situation in which the door is accidentally opened in a case where impact force is applied in the left and right direction of the vehicle due to a side collision and the like.

In the embodiment described above, the block parts 21B and 22B are disposed as restriction mechanisms on the lever main body 21 and the inertia lever part 22, respectively, but the present disclosure is not limited thereto. For example, a similar working effect can be exhibited with a configuration of causing, when the inertia lever part 22 rotates to be disposed at the non-operating position, the inertia lever part 22 to simply slide in the axial direction with respect to the lever main body 21. The inertia lever part 22 is rotated with respect to the lever main body 21 to be disposed at the non-operating position in a case where impact force is applied, but the present disclosure is not limited thereto. The inertia lever part 22 may be slid to be disposed at the non-operating position. In this case, returning movement may be regulated by configuring the restriction mechanism to cause the inertia lever part 22 to rotate with respect to the lever main body 21, for example. The single torsion coil spring 24 implements the function of energizing the inertia lever part 22 to be maintained at the operating position with respect to the lever main body 21, and the function of energizing the inertia lever part 22 toward the non-operating position, but each of the functions may be configured by an individual energizing member.

The embodiment described above exemplifies the ratchet 14 and the ratchet lever 14*a* that are integrally formed.

Alternatively, the ratchet and the ratchet lever may be separately formed so long as the engaging state of the ratchet 14 with the latch 12 can be released by operation of the ratchet lever 14*a*.

According to the present disclosure, the inertia lever part moves to the non-operating position with respect to the lever main body in a case where impact force is applied to the vehicle, and returning movement to the operating position of the inertia lever part with respect to the lever main body is restricted by the restriction mechanism. Accordingly, after the inertia lever part is once disposed at the non-operating position, the ratchet lever does not operate even in a case where the door handle is operated in the opening operation direction in this state, and it becomes possible to more securely prevent the situation in which the door is accidentally opened when impact force is applied to the vehicle main body.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A door latch device comprising:

an open link housed in the door latch device, the open link configured to operate in a case where an opening operation is performed on a door handle, and transmit an operation force to a ratchet lever in the case where the opening operation is performed on the door handle, the open link including:

a lever main body configured to move in accordance with the opening operation performed on the door handle;

an inertia lever part supported by the lever main body so as to be displaceable between an operating position and a non-operating position; and an energizing member configured to energize the inertia lever part to be maintained at the operating position with respect to the lever main body, the operation force of the door handle being not transmitted to the ratchet lever, in a case where the inertia lever part is disposed at the non-operating position against energizing force of the energizing member;

the ratchet lever configured to release an engaging state of a ratchet with a latch in a case where the operation force is applied via the open link; and a restriction mechanism disposed between the lever main body and the inertia lever part, the restriction mechanism being configured to restrict returning movement to the operating position in a case where the inertia lever part moves to the non-operating position, wherein the inertia lever part is disposed to be relatively rotatable about a predetermined axis as a center and to be relatively slidable along the axis with respect to the lever main body, and is configured to rotate about the axis as the center to move to the operating position and the non-operating position, and the restriction mechanism causes the inertia lever part to slide along the axis with respect to the lever main body to be disposed at a predetermined shift position in a case where the inertia lever part rotates from the operating position toward the non-operating position.

2. The door latch device according to claim 1, wherein the restriction mechanism includes block parts disposed between the lever main body and the inertia lever part and configured to be opposed to each other in a circumferential direction in a case where the inertia lever part is disposed at the shift position to prevent rotation from the non-operating position toward the operating position.

3. The door latch device according to claim 1, wherein the restriction mechanism includes a shift energizing member configured to energize the inertia lever part toward the shift position with respect to the lever main body.

4. The door latch device according to claim 3, wherein the release energizing member is a torsion coil spring centered on an axis about which the lever main body and the inertia lever part relatively rotate, and configured to function as the shift energizing member.

* * * * *